US011778503B1

(12) United States Patent
Han et al.

(10) Patent No.: US 11,778,503 B1
(45) Date of Patent: Oct. 3, 2023

(54) ASSOCIATION IDENTIFIER ASSIGNMENT FOR COMPACT TRAFFIC INDICATION MAP

(71) Applicant: Hewlett Packard Enterprise Development LP, Houston, TX (US)

(72) Inventors: Jianpo Han, Beijing (CN); Zhen Zhong, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/728,457

(22) Filed: Apr. 25, 2022

(51) Int. Cl.
*H04W 28/02* (2009.01)
*H04W 28/22* (2009.01)
*H04L 1/1607* (2023.01)

(52) U.S. Cl.
CPC ....... *H04W 28/0263* (2013.01); *H04L 1/1614* (2013.01); *H04W 28/22* (2013.01)

(58) Field of Classification Search
CPC ......... H04W 72/1205; H04W 72/1263; H04W 72/1289; H04W 92/18; H04W 72/1242; H04W 72/1268; H04W 72/12; H04W 72/10; H04W 48/12; H04W 84/12; H04W 12/73; H04W 4/06; H04W 4/23; H04W 40/24; H04W 48/08; H04W 48/16; H04W 72/0446; H04W 72/121; H04W 72/23; H04W 72/30; H04W 74/0808; H04W 76/11; H04W 76/15; H04W 76/40; H04W 8/245; H04W 80/02; H04W 88/02; H04W 88/10; H04W 92/02; H04W 92/10; H04W 72/04; H04W 74/08; H04W 8/24; H04L 1/1812; H04L 5/00; H04L 1/1621; H04L 1/1685; H04L 45/16; H04B 17/336; H04B 7/024; H04B 7/0619; H04B 7/06; Y02D 30/70

See application file for complete search history.

(56) References Cited

U.S. PATENT DOCUMENTS 9,854,469 B2  12/2017 Wang et al.
2018/0302923 A1* 10/2018 Patil .................... H04W 74/008
(Continued)

FOREIGN PATENT DOCUMENTS

EP  4138476 A1 *  2/2023
EP  4175329 A1 *  5/2023  .............. H04W 4/06
(Continued)

*Primary Examiner* — Nathan S Taylor
(74) *Attorney, Agent, or Firm* — Hewlett Packard Enterprise Patent Department

(57) ABSTRACT

Examples of techniques for Association Identifier (AID) assignment are disclosed. In an example, a controller managing an AP may allocate a set of numbers for AID assignment to clients connecting to VAPs in a multiple BSSID set of the AP. The controller may configure the AP to assign AIDS to non-Multi-Link (non-ML) clients from a first subset of the set based on a first monotonic sequence and assign AIDS to ML clients from a second subset of the set based on a second monotonic sequence. The AP may receive an association request from a client to associate with a VAP of the multiple BSSID set, determine whether Multi-Link operation (MLO) is enabled for the client, and in response to determining that MLO is disabled for the client device, assign a first AID to the client from the first subset based on the first monotonic sequence.

20 Claims, 8 Drawing Sheets

(56) References Cited

U.S. PATENT DOCUMENTS

| | | | |
|---|---|---|---|
| 2019/0215884 A1* | 7/2019 | Patil | H04W 52/0216 |
| 2020/0036618 A1* | 1/2020 | Asterjadhi | H04W 24/02 |
| 2020/0374754 A1 | 11/2020 | Chu et al. | |
| 2020/0404737 A1 | 12/2020 | Cariou et al. | |
| 2021/0014776 A1* | 1/2021 | Patil | H04W 48/08 |
| 2021/0014911 A1* | 1/2021 | Patil | H04W 72/0446 |
| 2021/0051513 A1 | 2/2021 | Min et al. | |
| 2021/0120455 A1 | 4/2021 | Das et al. | |
| 2021/0120612 A1 | 4/2021 | Park et al. | |
| 2021/0144787 A1 | 5/2021 | Kwon et al. | |
| 2021/0212141 A1 | 7/2021 | Chu et al. | |
| 2021/0212156 A1 | 7/2021 | Kwon et al. | |
| 2021/0345418 A1* | 11/2021 | Asterjadhi | H04W 74/006 |
| 2022/0173773 A1* | 6/2022 | Lou | H04B 17/336 |
| 2022/0264652 A1* | 8/2022 | Viger | H04W 74/02 |
| 2022/0322426 A1* | 10/2022 | Viger | H04L 5/0044 |
| 2022/0381898 A1* | 12/2022 | Zhang | G06F 3/011 |
| 2022/0408349 A1* | 12/2022 | Kneckt | H04W 48/16 |
| 2023/0071851 A1* | 3/2023 | Gan | H04W 40/24 |
| 2023/0145827 A1* | 5/2023 | Gan | H04W 24/02 |
| | | | 370/329 |

FOREIGN PATENT DOCUMENTS

| | | | | |
|---|---|---|---|---|
| WO | 2018/080602 A1 | 5/2018 | | |
| WO | WO-2022079149 A1 * | 4/2022 | | H04W 28/0215 |

* cited by examiner

ASSOCIATION IDENTIFIER ASSIGNMENT FOR COMPACT TRAFFIC INDICATION MAP

BACKGROUND

A Wireless Local Area Network (WLAN) may include Wireless Access Points (APs), as elements of the WLAN. These APs may act as points of attachment to a wireless network. Client devices may associate with an AP and access other network resources in the WLAN. When a client device associates with an AP, the AP assigns an Association Identifier (AID) to the client device. The AID may be a numerical tag that identifies the particular client device with the AP.

BRIEF DESCRIPTION OF DRAWINGS

The present disclosure, in accordance with one or more various embodiments, is described in detail with reference to the following figures. The figures are provided for purposes of illustration only and merely depict typical or example embodiments.

Figure 1:
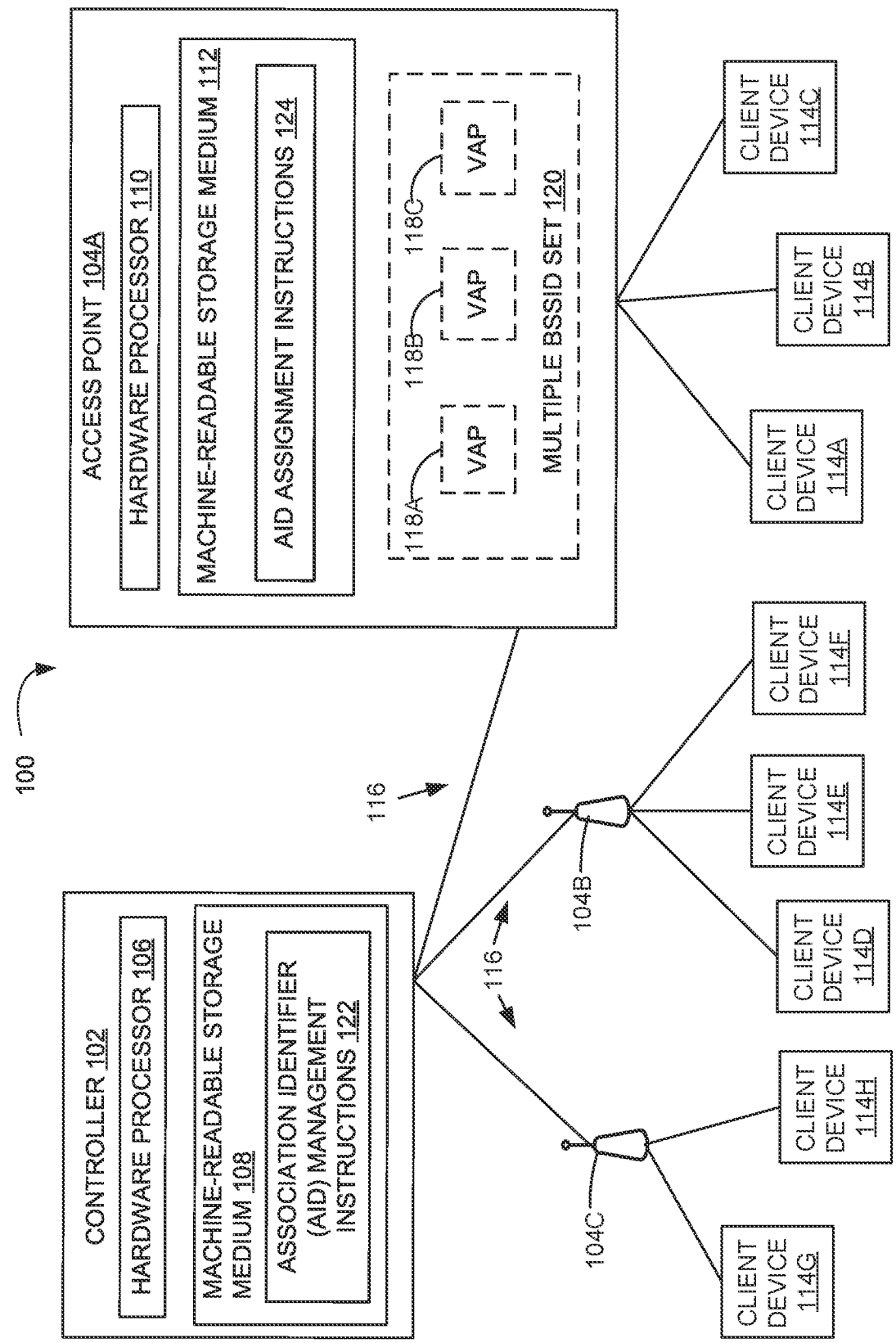
FIG. 1 illustrates an example of a network environment, in accordance with an embodiment of the present invention.

The figures are not exhaustive and do not limit the present disclosure to the precise form disclosed.

DETAILED DESCRIPTION

In WLAN, APs may advertise their presence to devices in the wireless network using management frames called beacons as per the Institute of Electrical and Electronic Engineers (IEEE) 802.11 standards. The beacon may include a timestamp, capability information, a Service Set Identifier (SSID), supported rates, and different information elements. One such information element in the beacon is a Traffic Indication Map (TIM).

In some Wi-Fi Multi Media (WMM) clients a WMM power save mode may be enabled or disabled. When the WMM power-save mode is enabled, the client device can periodically go into a power-save/sleep mode between transmitting uplink packets to save power. The AP may buffer downlink packets for the client while it is in power-save mode. The TIM is an indication of this buffered data. The TIM includes a bitmap to indicate client devices running in a power-save mode that the AP has buffered data waiting for it. The bitmap refers to a collection of bits, each bit representing an AID of a client device wirelessly associated with the AP. Based on the bit corresponding to a particular client device being set or reset, the client device may determine whether the AP has buffered data for it.

Generally, AIDS may be assigned to client devices associating with an AP from a common pool of numerical values. The common pool may be shared by all client devices in all frequency bands operating in the AR The AP may have buffered data for some of its clients and no buffered data for others, so effectively a portion of the bitmap representing those clients for which the AP has buffered data needs to be transmitted. Thus, generally the bitmap is not transmitted in its entirety, rather, a Partial Virtual Bitmap (PVB) is transmitted in the TIM included in the beacon. Each bit of the PVB represents an AID of a client device associated with the AP. If the AP has buffered data for a client device, a bit in the PVB representing the AID of the client device is set to 1, otherwise, the bit is set to 0.

The TIM may also include a bitmap control offset field indicating the AID from which the PVB begins. The Bitmap control offset may indicate the specific bit of PVB from where it starts by providing an indication of the bits which are zero and need not be included in the PVB. However, there may be scenarios where in spite of using the bitmap control offset, bits which are set to zero are included in the PVB thereby increasing a length of the TIM which makes the beacon bulky.

Consider an example, where clients with AIDs 1 to 100 are connected to an AP. If the AP has buffered data for clients with AIDS 99 and 100, the bitmap control offset may point to bit 99 of the PVB indicating that bits 0 to 98 of the PVB are set to "0". The PVB in such a case will include two bits, i.e., bits 99 and 100 set to "11" in binary. However, in a scenario where the AP has buffered data for clients with AIDS 10 and 80, the bitmap control offset may point to bit 10 indicating that bit 0 to bit 9 are set to "0" and the PVB may be set as "100 . . . 001" in binary. As a result, there may be a number of zeros in the PVB to communicate that the clients with AIDS in between 10 and 80 do not have any buffered data. Thus, although the bitmap control offset may indicate continuous "0" bits of the PVB, however, intermediate "0" bits between two bits set to "1" may not be indicted by the bitmap control offset. These intermediate "0" bits may contribute to overhead information in the TIM which may make the TIM lengthy and the beacon bulky. There may be chances of failure in transmitting such a bulky beacon.

Further, the above issue regarding a lengthy TIM may aggravate with increasing number of clients. Also, multiple Virtual Access Points (VAPs) may be configured within a single physical AP. A VAP includes a multiplexed installation of a single physical AP so that it presents itself as multiple discrete APs to WLAN clients. Multiple VAPs running on a single physical AP are referred to as co-located VAPs. In some examples, co-located VAPs may be configured as part of a multiple Basic Service Set Identifier (BSSID) set. A multiple BSSID set include VAPs with a common operating class, channel, channel access functions, receive antenna connector, and transmit antenna connector. VAPs included in a multiple BSSID set usually send a single beacon with information about all the VAPs in the multiple BSSID set instead of sending one beacon each for each of the VAPs in the multiple BSSID set. With multiple BSSID functionality enabled for VAPs, because a single beacon is sent for all the VAPs in the multiple BSSID set, the TIM in such a beacon of a multiple BSSID set may be lengthy. Transmitting such lengthy TIMs in the beacon may further tend to exhaust space in the beacon frame and the beacon may become bulky increasing chances of failure in beacon transmission and may lead to service interruption.

Also, the IEEE has formed a working group for IEEE 802.11be: Enhancements for Extremely High Throughput (EHT) which may be the potential next amendment to the IEEE 802.11 WLAN standards. One of the candidate features in IEEE802.11be is Multi-Link Operation (MLO) in 2.4 GHz, 5 GHz, and 6 GHz frequency bands. In MLO between an AP and a client device (a non-AP station) for which MLO is enabled, data exchange between the client and the AP may happen over multiple frequency bands, such as the 2.4 GHz band, 5 GHz band, and the 6 GHz band, simultaneously, by using wireless link aggregation. Implementation of MLO with multiple BSSID set enabled in a 6 GHz band may further cause the TIM length to increase. Consider a scenario where VAPs, VAP0 and VAP1, operating in the 6 GHz band are included in a multiple BSSID set and VAP0 is affiliated to a multi-link device MLD0 and VAP1 is affiliated to another multi-link device MLD1. Each of the Multi-link devices MLD0 and MLD1 include a collection of VAPs operating on different frequency bands. In such a scenario, a single beacon transmitted by the multiple BSSID set may include TIMs of VAP0 and VAP1 as part of the multiple BSSID set and also TIMs of MLD0 and MLD1 to which these VAPs are affiliated for MLO. Thus, in such a scenario with both multiple BSSID and MLO enabled, the TIM may get lengthier which may cause the beacon frame to be bulkier thereby aggravating chances of failure in beacon transmission. Thus, as explained above, there may be challenges of failure in beacon transmission due to lengthy TIM in the beacon frame.

The present invention allows AID assignment to client devices in such a manner that a compact TIM is generated consequently reducing the size of the beacon and preventing failures in beacon transmission. In an example, methods and systems of the present invention allocate a set of numbers for AID assignment to client devices connecting to VAPs in a multiple BSSID set. Further, in an example, if multiple BSSID functionality is not enabled, such as for VAPs in the 2.4 GHz or 5 GHz bands, another set of numbers may be allocated for AID assignment to client devices connecting to a VAP configured in the AP. In an example, the numbers in the set are natural numbers. Further, the methods and systems configure the AP to assign AIDs to non-Multi-Link (MO client devices from a first subset of the set of numbers based on a first monotonic sequence. The non-ML client devices include non-AP stations for which MLO is disabled. The first subset is dedicated for AID assignment to non-ML client devices. In an example, the first monotonic sequence refers to a sequence of consecutive numbers in the first subset which may either be increasing or decreasing and is bounded by a minimum value and a maximum value.

Further, the methods and systems configure the AP to assign AIDs to ML client devices from a second subset of the set of numbers based on a second monotonic sequence. In an example, an ML client device refers to a non-AP station which has MLO enabled. The second subset is dedicated for AID assignment to ML client devices. In an example, the second monotonic sequence refers to a sequence of consecutive numbers in the second subset which may either be increasing or decreasing and is bounded by a minimum value and a maximum value. The second monotonic sequence is different from the first monotonic sequence. For example, if the first monotonic sequence is a decreasing order the second monotonic sequence is an increasing order, and vice versa. An AP configured according to the methods of the present invention may receive an association request from a client device to associate with a VAP implemented in the AP. Based on the association request, the AP may determine whether MLO is enabled for the client device. In response to determining that MLO is disabled for the client device, the AP may assign a first AID to the client device from the first subset based on the first monotonic sequence. With the AID assignment as described herein, the length of the PVB of the TIM included in the beacons may be reduced. This is because separate sets of numbers are allocated for AID assignment in a multiple BSSID set and to each VAP not included in the multiple BSSID set. Also, assignment of AIDs to non-ML and ML client devices from separate subsets of numbers, i.e., the first and second subsets, allows in reduction of length of the PVB and makes the TIM compact. Reduction in TIM length may reduce overall length of the beacon. Thus, the TIM and the beacon becomes compact and consequently failures in beacon transmission may be reduced/eliminated.

The following detailed description refers to the accompanying drawings. Wherever possible, the same reference numbers are used in the drawings and the following description to refer to the same or similar parts. While several embodiments of the present invention are described herein, modifications, adaptations, and other implementations of those embodiments are possible. Accordingly, the following detailed description does not limit the scope of the present invention. Instead, the proper scope of the present invention is defined by the appended claims.

FIG. 1 illustrates an example of a network environment 100, in accordance with an embodiment of the present invention. This diagram illustrates an example of a configuration implemented with an organization having multiple users (or at least multiple client devices). The network environment 100 may include an office, campus, home, or other network installation. The network environment 100 may be a private network, such as a network that may include security and access controls to restrict access to authorized users of the private network. Authorized users may include, for example, authorized employees, residents, university students, customers, and so on.

In the illustrated example, the network environment 100 includes a controller 102. The controller 102 may provide communication with another network, like a public or private network, such as the Internet, A single controller 102 is illustrated, though the network environment 100 may include multiple controllers.

The controller 102, also called a WLAN controller, may be operable to configure and manage network devices. The controller 102 may be operable to configure and/or manage switches, routers, access points, and/or client devices connected to a network. The controller 102 may itself be, or provide the functionality of, an access point. The controller 102 may be in communication with one or more wireless APs 104A-C. APs 104A-C provide network connectivity to various client devices 114A-H. Using a connection to an AP 104A-C, a client device 114A-H may access network resources, including other devices on the network environment 100. Examples of client devices may include desktop computers, laptop computers, tablet computers, e-readers, netbook computers, personal digital assistants (PDAs), mobile phones, smart phones, smart terminals, dumb terminals, virtual terminals, video game consoles, virtual assistants, Internet of Things (IOT) devices, and the like.

APs 104A-C are included as example of a point of access to the network established in the network environment 100 for wireless client devices 114A-H. The APs 104A-C may control network access of the client devices 114A-C and may authenticate the client devices 114A-H for connecting to the APs and through the APs, to other devices within the network environment 100. Each of APs 104A-C may be a combination of hardware, software, and/or firmware that is configured to provide wireless network connectivity to wireless client devices 114A-H. In the illustrated example, APs 104A-C can be managed and configured by the controller 102. APs 104A-C communicate with the controller 102 and the network environment 100 over connections 116, which may be wired or wireless interfaces.

In the example of FIG. 1, the present invention is illustrated in detail with reference to AP 104A. However, any of the APs 104B-C may have a similar configuration as that of the AP 104A and the methods and systems of the present invention explained with respect to the AP 104A may also be performed for the APs 104B-C. The AP 104A includes VAPs 118A, 118B, and 118C. The VAPs 118 are included in a multiple BSSID set 120. A multiple BSSID set includes VAPs with a common operating class, channel, channel access functions, receive antenna connector, and transmit antenna connector. VAPs included in a multiple BSSID set usually send a single beacon with information about all the VAPs in the multiple BSSID set. All VAPs within the multiple BSSID set are assigned in a way that BSSIDs of the VAPs are not available as MAC addresses for stations using a different operating class, channel, receive antenna connector, or transmit antenna connector. The multiple BSSID set 120 and VAPs 118 as illustrated by dotted lines in FIG. 1 may be virtual entities configured in the physical AP 104A. In some examples, the VAPs 118 may be distributed in a group of APs. Each VAR may broadcasts its own SSID and may have its own network interface with a BSSID. In an example, an AP profile corresponding to AP 104A may be configured in the AP 104A or the group of APs. The settings associated with the VAPs 118 and the multiple BSSID set 120 may be adjusted using the AP profile. Although three VAPs are shown to be configured, there may be more than three or less than three VAPs within the AP 104A. The VAPs 118 may also be configured such that they are not included in the multiple BSSID set 120.

As shown the controller 102 includes a hardware processor 106 and a machine-readable storage medium 108. The AP 104 also includes a hardware processor 110 and a machine-readable storage medium 112. The hardware processors 106 and 110 may be one or more central processing units (CPUs), semiconductor-based microprocessors, and/or other hardware devices suitable for retrieval and execution of instructions stored in the machine-readable storage media 108 and 112. The hardware processors 106 and 110 may fetch, decode, and execute instructions, such as instructions, for management of AID assignment by the AP 104.

In some embodiments, machine-readable storage media 108 and 112 may be a non-transitory storage medium, where the term "non-transitory" does not encompass transitory propagating signals. As described in detail below, machine-readable storage media 108 and 112 may be encoded with executable instructions for management and assignment of AID. The instructions include AID management instructions 122 stored in machine-readable storage medium 108 and AID assignment instructions 124 stored in machine-readable storage medium 112.

The hardware processor 106 may execute AID management instructions 122 to allocate a set of numbers for AID assignment to clients connecting to VAPs 118 in a multiple BSSID set 120 configured in the AP 104A. The AID refers to a numerical tag that identifies a particular client device with the AP. In an example, the set of numbers refers to consecutive natural numbers starting from 1 to 1024. In an example, the multiple BSSID set 120 is operating in a 6 GHz frequency band. The set of numbers acts as a pool or range of numbers from which AIDS may be assigned to clients connecting to VAPs 118 in the multiple BSSID set 120. In an example, where more than one multiple BSSID sets are configured in the AP 104A, a set of numbers is allocated corresponding to each multiple BSSID set. Also, a separate set of numbers is allocated for AID assignment to client devices connecting to a VAP configured in the AP 104, where the VAP is not included in the multiple BSSID set 120. In an example, the VAP may be operating in the 2.4 GHz or 5 GHz band.

In an example, a network administrator may configure two multiple BSSID sets, viz., MBSSID1 and MBSSID2, in the 6 GHz band of the AP 104A. Based on the above configuration of the AP 104A, the controller 102 may allocate a set of numbers from 1 to 1024 to MBSSID1 and another set of numbers from 1 to 1024 to MBSSID2. As a consequence, two clients, one associating with a VAP of MBSSID1 and another associating with a VAP of MBSSID2 may have an identical AID. However, the AIDS of the two clients are carried in different beacons one for MBSSID1 and another for MBSSID2 and remain unique within group of client devices associating to a single multiple BSSID set. Therefore, using the same numerical range for AID assignment to clients of different multiple BSSID sets do not cause any confusion regarding the identities of the clients.

Further, the hardware processor 106 may execute AID management instructions 122 to configure the AP 104A to assign AIDS to non-ML client devices from a first subset of the set of numbers based on a first monotonic sequence. In an example, a non-ML client device refers to a non-AP station which does not have MLO capabilities. MLO capabilities of a client device may be indicated in an association request from the client. In an example, an information element in the association request may indicate MLO capabilities of the client. The AP on receiving the association request from the client device may be aware whether the client is a ML client or a non-ML client.

In an example, the first subset includes a range of consecutive numbers from the set. Suppose, the set of numbers ranges from 1 to 1024, in an example, the first subset may include numbers between 30 to 511. In another example, the first subset may include numbers between 512 to 1024. The first subset may be predefined based on a type of network deployment and client devices in the network. For example, if the network serves a substantial number legacy client devices which have no MLO capabilities, then a range of numbers included in the first subset may be greater than a range of numbers in the second subset. Alternatively, if the network serves a substantial number of client devices having MLO capabilities, a range of numbers included in the first subset may be less than a range of numbers included in the second subset. The first monotonic sequence may be an ascending or descending order of the numbers in the first subset. In an example, each AID assigned to a client device from the first subset based on the first monotonic sequence is either greater than or less than the previous AID assigned by "1".

The hardware processor 106 may further execute AID management instructions 122 to configure the AP 104A to assign AIDs to ML client devices from a second subset of the set of numbers based on a second monotonic sequence. In an example, an ML client device refers to a non-AP station which has MLO capabilities. The second subset is different from the first subset and includes another range of consecutive numbers from the set. Suppose, the set of numbers ranges from 1 to 1024, and the first subset includes numbers from 30 to 511, in such an example, the second subset may include numbers from 512 to 1024. In another example, the first subset may include numbers between 512 to 1024, in which case, the second subset may include numbers from 30 to 511. Thus, the second subset may have a boundary value consecutive to a boundary value of the first subset. That is, in some examples, the smallest number of the second subset may be consecutive to the largest number of the first subset or vice versa. The second subset may be predefined based on a type of network deployment and client devices in the network. The second monotonic sequence may be an ascending or descending order of the numbers in the second subset. In an example, each AID assigned to a client device from the second subset based on the second monotonic sequence is either greater than or less than the previous AID assigned by "1". Thus, using the AID management instructions 122, the controller 102 may configure the AP 104A for AID assignment.

In an example, the hardware processor 110 may execute AID assignment instructions 124 to receive an association request from a client device 114 to associate with one of the VAPs 118. In an example, the association request may include BSSID of the VAP, operating class, supported rates, capability, etc.

The hardware processor 110 may execute AID assignment instructions 124 to determine, based on the association request, whether MLO is enabled for the client device 114. In response to determining that MLO is disabled for the client device, the hardware processor 110 may execute AID assignment instructions 124 to assign an AID to the client device 114 from the first subset based on the first monotonic sequence.

Figure 2A:
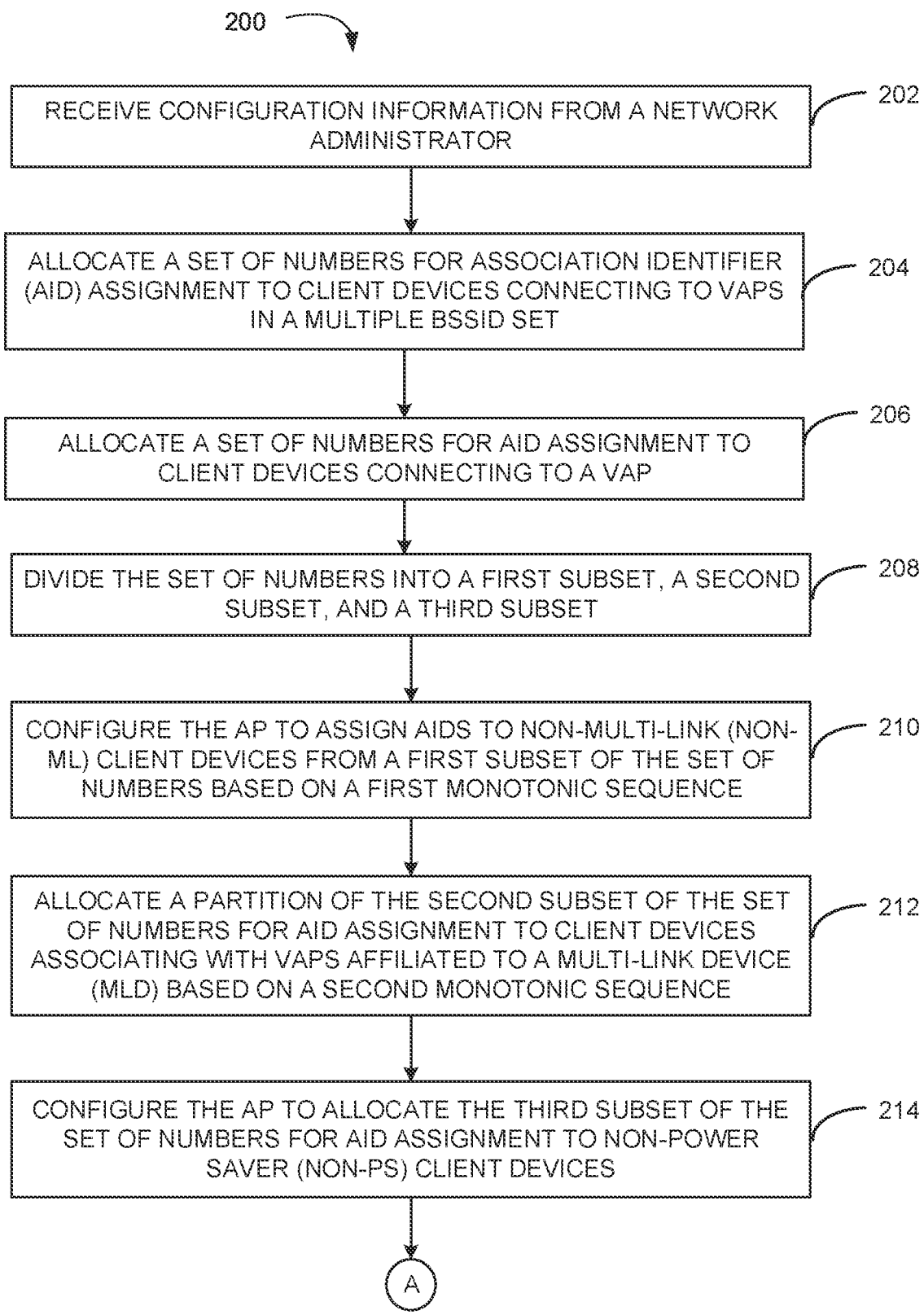
FIGS. 2A and 2B illustrate an example method for managing and assigning AIDs, in accordance with an embodiment of the present invention.

FIG. 2A illustrates an example method 200 for managing AID assignment, in accordance with an embodiment of the present invention. In an example, steps 202 to 214 of the method 200 may be executed by a controller, such as the controller 102 of FIG. 1 and steps 216 to 226 of the method 200 may be executed by an AP, such as the AP 104 of FIG. 1. The method 200 can be implemented by processing resource(s) or computing device(s) through any suitable hardware, a non-transitory machine readable medium, or combination thereof. In an example, the method 200 may be performed by computer-readable instructions, which include instructions stored on a medium and executable by a processing resource, such as a hardware processor, of the controller or the AP.

Referring to FIG. 2A, the controller may receive the configuration information of the AP from the network administrator, at block 202. The configuration information may include BSSID setup, SSID setup, capabilities, operating channel, operating class, etc., of VAPs configured to operate in each frequency band of the AP. In an example, the configuration information may include VAP profiles corresponding to different VAPs running in the AP. The network administrator may input the configuration information at a time of deployment of the AP in the network. Further, the controller may identify a number of VAPs configured to operate in each of 2.4 GHz, 5 GHz, and 6 GHz frequency bands. Also, the controller may identify VAPs included in a multiple BSSID set and affiliated to an MLD based on the configuration information.

At block 204, the controller is configured to allocate a set of numbers for AID assignment to client devices connecting to VAPs in the multiple BSSID set. In an example, depending on the configuration information of the AP, the controller may identify multiple BSSID sets configured in the AP. The controller may then allocate a set of numbers per multiple BSSID set for AID assignment. Thus, for each multiple BSSID set configured to operate in the 6 GHz frequency band, a separate set of numbers is allocated for AID assignment. During association of a client device with a VAP in a multiple BSSID set, the AP managed by the controller may assign a number from the corresponding set of numbers as an AID to the client device.

Further, at block 206, the controller is configured to allocate another set of numbers for AID assignment to client devices connecting to another VAP co-located in the AP and not included in the multiple BSSID set. In an example, the other VAP may operate in one of a 2.4 GHz, 5 GHz, or 6 GHz frequency band. Thus, the controller may also allocate a set of numbers per VAP for AID assignment to client devices connecting to the VAP.

At block 208, the set of numbers allocated to a multiple BSSID set or a VAP is divided into a first subset, a second subset, and a third subset. In an example, the second subset has a boundary value consecutive to a boundary value of the first subset. The boundary value refers to a maximum or minimum value in a subset. Further, in an example, the third subset may include numbers near a boundary value of the set of numbers. In an example, the third subset may include first twenty numbers or last twenty numbers in the set of numbers. In an example, ranges of each of the subsets may be predefined based on a type of the deployment. For example, for a deployment with high number of MLDs and ML clients, the range of the second subset may be greater than a range of the first subset. In another example, in a deployment with higher number of legacy clients which may not have MLO capabilities, the range of the first subset may be greater than a range of the second subset. The range of the third subset depends on a number of non-Power Save (PS) clients in the network. In an example, the non-PS clients refer to client devices for which power-save mode is generally disabled, such as mesh points, uplink clients, etc.

At block 210, the controller may configure the AP to assign AIDS to non-ML client devices from the first subset of the set of numbers based on a first monotonic sequence. In an example, the first monotonic sequence is a descending order of consecutive numbers in the first subset starting with the highest number in the first subset. The controller may configure the AP such that when a non-ML client device attempts to associate with a VAP in a multiple BSSID set, a number from the first subset of the set of numbers allocated to the multiple BSSID set is assigned as AID to the non-ML client. If the non-ML client is the first client for the multiple BSSID set, then the AID allocated is the highest number in the first subset. With increasing number of non-ML clients joining VAPs in the multiple BSSID set, the AIDS are allocated from the first subset of the set of numbers allocated to the multiple BSSID set starting from the highest value in a gradually decreasing order.

At block 212, the controller may be configured to allocate a partition of the second subset of the set of numbers for AID assignment to client devices associating with VAPs affiliated to a Multi-Link Device (MLD) based on a second monotonic sequence. In an example, the second subset of the set numbers may be divided into a plurality of partitions, viz., a first partition, a second partition, etc. Each partition of the second subset of the set of numbers may correspond to an MLD. For example, a first partition of the second subset of the set of numbers may be allocated for AID assignment to clients associating with VAPs affiliated to a first MLD, a second partition of the second subset of the set of numbers may be allocated for AID assignment to clients associating with VAPs affiliated to a second MLD, and so on. The partition of the second subset may include a range of numbers within the second subset. Further, each partition of the second subset may be shared among client devices associating with any of the VAPs affiliated to the corresponding MLD and thus may act as a common range of numbers for AID assignment to clients associating with VAPs affiliated to the corresponding MLD. In an example, the second monotonic sequence is an increasing order of consecutive numbers in a partition of the second subset of the set of numbers starting with the lowest number in the partition. The controller may configure the AP such that when an ML client device associates with one of the VAPs affiliated to the MLD, then an AID from the partition of the second subset of the set of numbers is assigned to the client device. In an example, if the ML client is the first one to join the MLD, then the AID assigned is the lowest numerical value in the partition of the second subset of the set of numbers. In an example, with increasing number of ML clients joining VAPs affiliated to the MLD, the AIDs are assigned from the partition of the second subset of the set of numbers, starting from the lowest value in a gradually increasing order.

At block 214, the controller is configured to allocate the third subset of the set of numbers for AID assignment to non-PS client devices. The third subset includes numbers near a boundary value of the set of numbers. The third subset may not share a common boundary value with the first subset and the second subset.

Figure 2B:
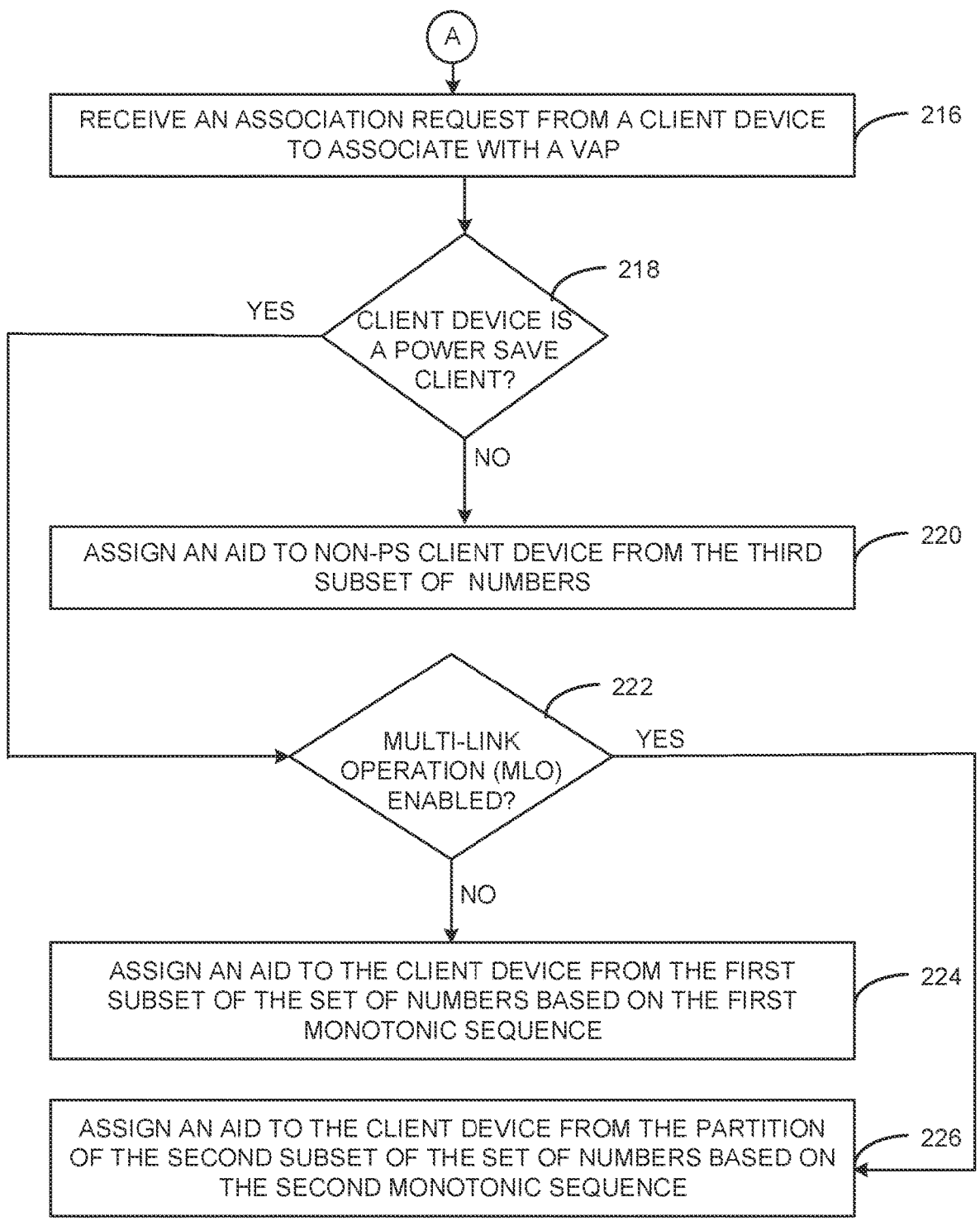

Referring to FIG. 2B, at block 216, the AP may receive an association request from a client device to associate with a VAP. In an example, the VAP is one of VAPs included in a multiple BSSID set operating in a 6 GHz frequency band. In an example, the association request may include information relating QoS capability, power capability, SSID, BSSID, supported rates, etc. The association request may also include an information element indicative of ML capabilities of the client device.

In response to receiving the association request, at block 218, the AP may check whether the client is a Power Saver (PS) client. In an example, a power saver client is a client device that may go into sleep mode or a low power mode after a fixed interval of operation. This allows the client device to save power while carrying out its functions. However, there may be some devices, such as mesh point devices and uplink clients who disable the power save mode due to operational constraints. Such clients for which power save mode of operation is disabled are referred to as non-PS clients. In an example, the AP may analyze the power capability of the client device using the information in the association request and may identify whether the client device is a PS or non-PS client.

In response to determining that the client device is a non-PS client ("No" branch from block 218), at block 220, the AP may assign an AID to the non-PS client device from the third subset of numbers allocated for AID assignment to non-PS clients. In response to determining that the client device is a PS client ("Yes" branch from block 218), at block 222, the AP may check whether MLO is enabled for the client device. In an example, the AP may check an ML capabilities information element in the association request frame received from the client device to determine whether MLO is enabled for the client.

In response to determining that MLO is disabled for the client device ("No" branch from block 222), at block 224, the AP may assign an AID to the client device from the first subset of the set of numbers based on the first monotonic sequence. In response to determining that MLO is enabled for the client device ("Yes" branch from block 222), at block 226, the AP may assign an AID to the client device from the partition of the second subset of the set of numbers based on the second monotonic sequence. Since, MLO is enabled for the client device, the AP is aware that association request from the client device is for associating with a VAP affiliated to an MLD. Thus, the AP assigns the AID from the partition of the second subset of the set of numbers allocated for AID assignment to clients of the MLD.

Figure 3:
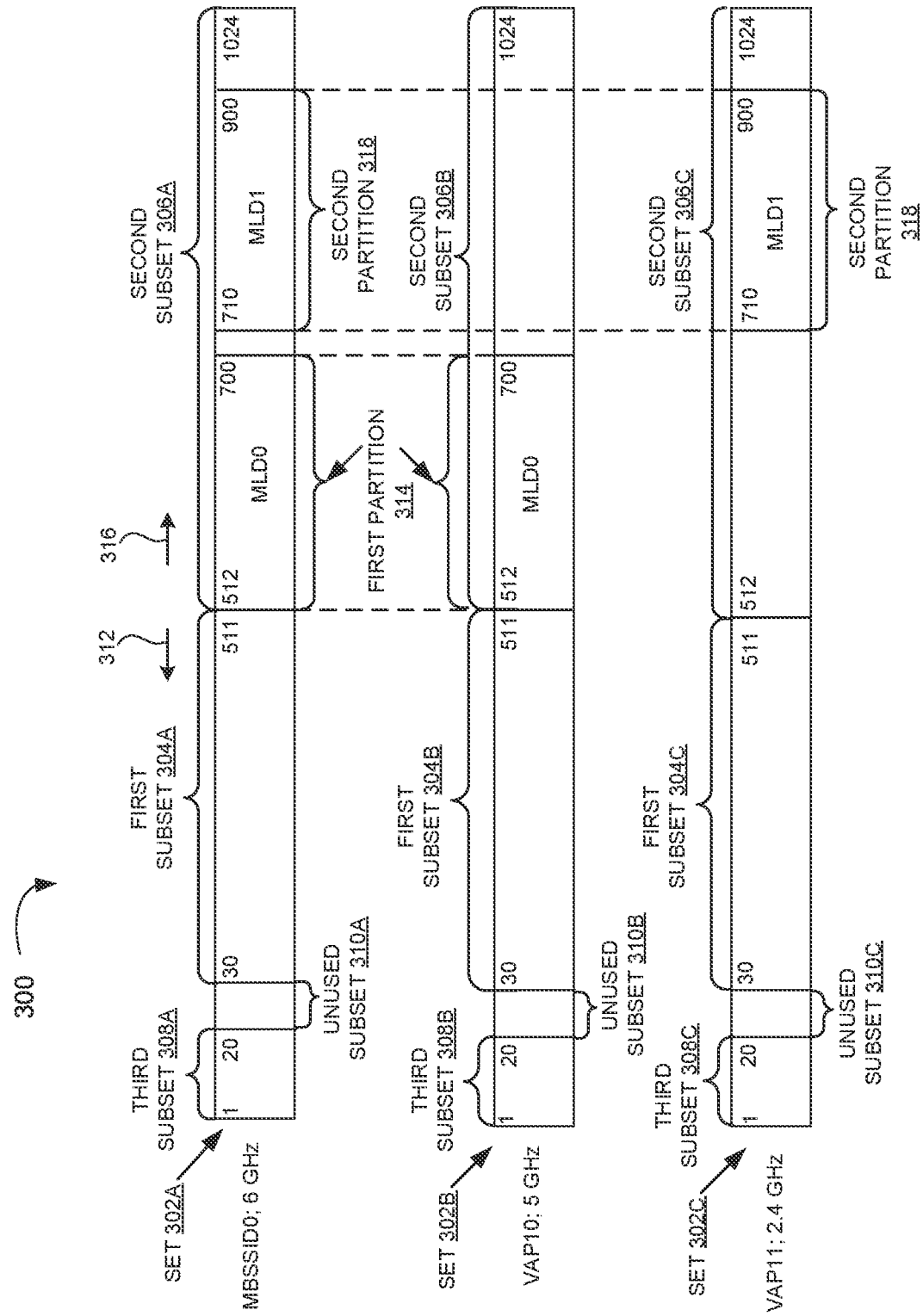
FIG. 3 illustrates an example distribution of sets and subsets of numbers for AID assignment, in accordance with an embodiment of the present invention.

FIG. 3 illustrates an example distribution 300 of sets and subsets of numbers allocated for AID assignment, in accordance with an embodiment of the present invention. In the example of FIG. 3, consider that four VAPs, viz., VAP0, VAP1, VAP10, and VAP11 belong to a co-located AP set of which VAP0 and VAP1 are part of a multiple BSSID set, MBSSID0 operating in 6 GHz band, VAP10 is operating on 5 GHz band and VAP11 is operating on 2.4 GHz band. Further, VAP0 and VAP10 are affiliated to multi-link device MLD0 and VAP1 and VAP11 are affiliated to multi-link device MLD1. A co-located AP set refers to a collection of two or more VAPs in the same physical AP. The physical AP may be configured as above based on configuration information input by a network administrator.

As shown in FIG. 3, the controller may allocate a set of numbers 302A, also called set 302A, for AID assignment to clients associating with VAPs included in MBSSID0. Set 302A has a minimum value 1 and a maximum value 1024 and includes all consecutive natural numbers in between 1 and 1024. Similarly, a set of numbers 302B, also called set 302B, and another set of numbers 302C, also called set 302C is allocated to each of VAP10 and VAP11 operating in the 5 GHz band and 2.4 GHz band, respectively. Both sets 302B-C has minimum and maximum values 1 and 1024 and includes all consecutive natural numbers in between. Although in the example of FIG. 3, same numerical ranges are allocated in sets 302A-C, in another example, the numerical range in sets 302A-C may be different.

Further, the controller may divide set 302A allocated to MBSSID0 into a first subset 304A, a second subset 306A, and a third subset 308A. As shown in FIG. 3, the first subset 304A ranges from 30 to 511, the second subset 306A ranges from 512 to 1024 and the third subset ranges from 1 to 20. As can be seen from FIG. 3, a minimum value of the second subset 306A is 512 which is consecutive to a maximum value of the first subset 304A, i.e., 511. The third subset 308A is isolated from the first and second subsets 304A and 306A, i.e., the first and second subsets 304A and 306A do not have a boundary value consecutive to a boundary value of the third subset 308A. The third subset 308A ranges from 1 to 20. The numbers from 21 to 29 are left unused and may not be used as AIDS for clients connecting to VAPs of MBSSID0. Thus, an unused subset 310A is maintained to ensure that the third subset 308A, used for non-PS clients, is isolated from the AIDs used for PS clients.

Further, the controller also divides set 302B allocated to VAP10 into first subset 304B ranging from 30 to 511, second subset 306B ranging from 512 to 1024, and third subset 308B ranging from 1 to 20. The controller also divides set 302C allocated to VAP11 into first subset 304C, second subset 306C, and third subset 308C with similar ranges as of 304B, 306B, and 308C. The ranges of the subsets of the sets 302A-C may be similar as shown in FIG. 3 or may vary for each set.

Also, each of the third subsets 308B-C is isolated from their respective first subsets 304B-C and second subsets 306B-C. Each of the third subsets 308B-C has a similar range, i.e., 1 to 20, as that of third subset 308A. Thus, the numbers from 21 to 29 are left unused and may not be used as AIDS for clients connecting to VAP10 or VAP11. As a result, unused subset 310B and 310C is maintained to ensure that the third subset 308B and 308C, used for non-PS clients of VAP10 and VAP11, is isolated from the AIDs used for PS clients. This also helps in generating a compact TIM as discussed later.

The controller may configure the AP such that AIDS are assigned to non-ML clients of MBSSID0, VAP10, and VAP11 from the first subsets 304A, 304B, and 304C, respectively, based on the first monotonic sequence. The first monotonic sequence is indicated by the arrow 312. The controller configures the AP such that when a non-ML client device attempts to associate with VAP0 or VAP1 of MBSSID0, a number from the first subset 304A is assigned as AID to the non-ML client. If the non-ML client is the first client for the MBSSID0, then the AID allocated is 511. With increasing number of non-ML clients joining VAPs in MBSSID0, the AIDs are allocated from the first subset 304A starting from the highest value 511 in a gradually decreasing order. Similarly, the controller configures the AP such that when a non-ML client device associates with VAP10 or VAP11, a number from the first subset 304B of set 302B or first subset 304C of set 302C, respectively, is assigned as AID to the non-ML client. If the non-ML client is the first client for VAP10 or VAP11, then the AID allocated is 511 from the respective first subsets. As more non-ML clients associate with VAP10 or VAP11, the AIDS are allocated from the first subset 304B of set 302B or first subset 304C of set 302C, respectively, starting from the highest value 511 in a gradually descending order. Although the first monotonic sequence is illustrated as a descending order of numbers in the first subsets 304A-C, in some examples, the first monotonic sequence may also be an ascending order of numbers in the first subsets.

The controller may further divide the second subset 306A of the set of numbers into a first partition 314 and a second partition 318. The first partition 314 corresponds MLD0 and the second partition 318 corresponds to MLD1. The controller may allocate the first partition 314 of the second subset 306A for AID assignment to ML client devices associating with VAP0 or VAP10 affiliated to MLD0. The first partition 314 may include a range of numbers, say, from 512 to 700. The first partition 314 is shared among ML client devices associated with either of VAP0 or VAP10 affiliated to MLD0 and acts as a common pool of numbers for AID assignment to ML clients associating with VAP0 and VAP10. As a result, the range of consecutive numbers from 512 to 700 is marked as first partition 314 for both the second subsets 306A and 306B of the set of numbers 302A and 302B, respectively.

The controller may configure the AP such that when an ML client device attempts to associate with VAP0 or VAP10 for MLO, then an AID from the first partition 314 is assigned to the client device. If the ML client is the first one to join MLD0, then the AID assigned is 512. In an example, with increasing number of ML clients joining VAP0 or VAP10 for MLO, the AIDs are assigned from the first partition 314, starting from the lowest value 512 in a gradually increasing order. Thus, the AIDs assigned from the first partition 314 of the second subset 306A or 306B is based on a second monotonic sequence shown by arrow 316 in FIG. 3.

Further, referring to FIG. 3, the second partition 318 of the second subset 306A is allocated for AID assignment to client devices associating with VAPs affiliated to MLD1. The second partition 318 may include a range of numbers, say, from 710 to 900. The second partition 318 is shared among ML client devices associating with VAP1 or VAP11 affiliated to MLD1 and acts as a common pool of numbers for AID assignment to ML clients associating with VAP1 and VAP11. As a result, the range of consecutive numbers from 710 to 900 is marked as the second partition 318 for both the second subsets 306A and 306C of the set of numbers 302A and 302C, respectively.

The controller may configure the AP such that when an ML client device attempts to join VAP1 or VAP11 for MLO, then an AID from the second partition 318 is assigned to the client device. If the ML client is the first one to join MLD1, then the AID allocated is 710. In an example, with increasing number of ML clients joining VAP1 or VAP11 for MLO, the AIDS are allocated from the second partition 318, starting from the lowest value 710 in a gradually increasing order. Thus, the AIDs assigned from the second partition 318 of the second subset 306A or 306C is based on the second monotonic sequence shown by arrow 316 in FIG. 3.

As shown in FIG. 3, the third subset 308A for the MBSSID0 ranges from 1 to 20. Thus, a non-PS client associating with VAP0 or VAP1 of MBSSID0 may be assigned an AID from the third subset 308A. Similarly, a non-PS client associating with VAP10 may be assigned an AID from the third subset 308B of the set 302B and a non-PS client associating with VAP11 may be assigned an AID from the third subset 3080 of the set 302C.

AID assignment based on the above configuration may be illustrated through examples described herein. Consider an example AID assignment by an AP configured according to the method 200. As explained earlier in connection with FIG. 3, the AP may have co-located VAPs, VAP0 and VAP1 included in multiple BSSID set MBSSID0 operating in 6 GHz band, VAP10 operating in 5 GHz band, and VAP11 operating in 2.4 GHz band. Say 10 clients, D1, D2, . . . , D10 associate with the AP having the co-located VAPs. The numeral associated with each client may indicate the order or sequence in which they associate with the AP, i.e., D1 is the first client to associate, D2 is the second client to associate, and so on. Consider that all the clients D1 to 010 are non-ML clients of which D3 and 07 are non-PS clients and rest are PS clients. D1, 02, D3, and D7 associate with VAP0 of MBSSID0, D10 associates with VAP1 of MBSSID0 and 04, D5, D6, D8, and D9 associate with VAP10.

Now with the AP configured according to the method 200, the AIDS assigned to the clients is shown as below in Table 1. Table 1 shows the VAPs to which each client associates with and corresponding AIDS assigned to each client, according to an example embodiment of the present invention. In an example, the AIDS mentioned in the below table may be assigned based on the example distribution 300 of sets and subsets of numbers for AID assignment shown in FIG. 3.

TABLE 1

| Client | Virtual Access Point (VAP) | Association Identifier (AID) |
|---|---|---|
| D1 | VAP0 | 511 |
| D2 | VAP0 | 510 |
| D3 | VAP0 | 1 |
| D4 | VAP10 | 511 |
| D5 | VAP10 | 510 |
| D6 | VAP10 | 509 |
| D7 | VAP0 | 2 |
| D8 | VAP10 | 508 |

TABLE 1-continued

| Client | Virtual Access Point (VAP) | Association Identifier (AID) |
|---|---|---|
| D9 | VAP10 | 507 |
| D10 | VAP1 | 509 |

Since D3 and D7 are non-PS clients associating with MBSSID0 the AP assigns AIDS 1 and 2 from the third subset 308A of FIG. 3. D1, D2, and D10 associating either with VAP0 or VAP1 of MBSSID0 are assigned AIDS from the first subset 304A of the set 302A based on the first monotonic sequence (a descending order in this case), starting from 511 to 509. D4, D5, D6, D8, and D9 are assigned AIDS from the first subset 304B of the set 302B based on the first monotonic sequence which is a descending order starting from 511 to 507. It may be noted that, two clients joining two different VAPs, may have an identical AID. However, since AID of a client is unique among clients of one multiple BSSID set or among clients of a single VAR there shah be no confusion concerning the identities of the clients.

In contrast to the example assignment of AIDs of the present invention as explained with reference to table 1, if a conventional AID assignment method had been implemented by the AP, the AIDS assigned to the clients D1 to D10 may be consecutive serial numbers from 1 to 10. Thus, AIDs for D1, D2, D9, and D10 may have been 1, 2, 9, and 10, respectively. Table 2 shows the VAPs to which each client associates with and corresponding AIDS assigned to each client according to conventional AID assignment method.

TABLE 2

| Client | Virtual Access Point (VAP) | Association Identifier (AID) |
|---|---|---|
| D1 | VAP0 | 1 |
| D2 | VAP0 | 2 |
| D3 | VAP0 | 3 |
| D4 | VAP10 | 4 |
| D5 | VAP10 | 5 |
| D6 | VAP10 | 6 |
| D7 | VAP0 | 7 |
| D8 | VAP10 | 8 |
| D9 | VAP10 | 9 |
| D10 | VAP1 | 10 |

Now suppose, the AP has buffered data for D2 and D10. An AP implementing the conventional AID assignment method, may generate a PVB with bits Bit2, Bit3, . . . , Bit10 in a TIM of a beacon from MBSSID0. Bit2 represents AID "2" of client D2 and Bit10 represents AID "10" of client D10. The bitmap control offset may point to Bit2 from which the PVB starts, since Bit1 may be set to "0", as there is no data buffered for D1. An example PVB generated by the AP in the TIM of the beacon from the MBSSID0 based on the conventional AID assignment method is shown below as "Bitmap 1".

Bitmap 1:

| Bit2 | Bit3 | Bit4 | Bit5 | Bit6 | Bit7 | Bit8 | Bit9 | Bit10 |
|---|---|---|---|---|---|---|---|---|
| 1 | 0 | 0 | 0 | 0 | 0 | 0 | 0 | 1 |

With AID assignment according to an embodiment of the present invention, the AP may generate a PVB with bits "Bit510 Bit509", where Bit510 represents AID "510" of D2 and Bit509 represents AID "509" of D10. The bitmap control offset in this case may point to Bit510, since Bit511 may be set to "0", as there is no data buffered for D1. An example PVB generated by the AP in the TIM of the beacon from the MBSSID0 based on the AID assignment according to an embodiment of the present invention is shown below as "Bitmap 2".

Bitmap 2:

| Bit510 | Bit509 |
|---|---|
| 1 | 1 |

Bitmap 2 includes 2 bits, whereas, Bitmap 1 includes 9 bits, as seen from a comparison of the bitmaps. Clearly, Bitmap 2 is more compact than Bitmap 1. Because, the zeros in Bit3 to Bit9 of Bitmap 1 are not included in Bitmap 2 and not transmitted in the PVB or TIM of the beacon from the multiple BSSID set, therefore the TIM generated by the AP of the present invention is compact. Consequently, a beacon frame of the multiple BSSID set, MBSSID0, including the compact TIM may also be compact and thereby failures in beacon transmission may be reduced. This improves connection efficiency. Although in the above example, a PVB generated for a beacon from a multiple BSSID set is considered, similar compact PVBs may also be generated for VAPs, such as VAP10 and VAP11 and MLDs, such as MLD0 & MLD1 of FIG. 3.

Figure 4:
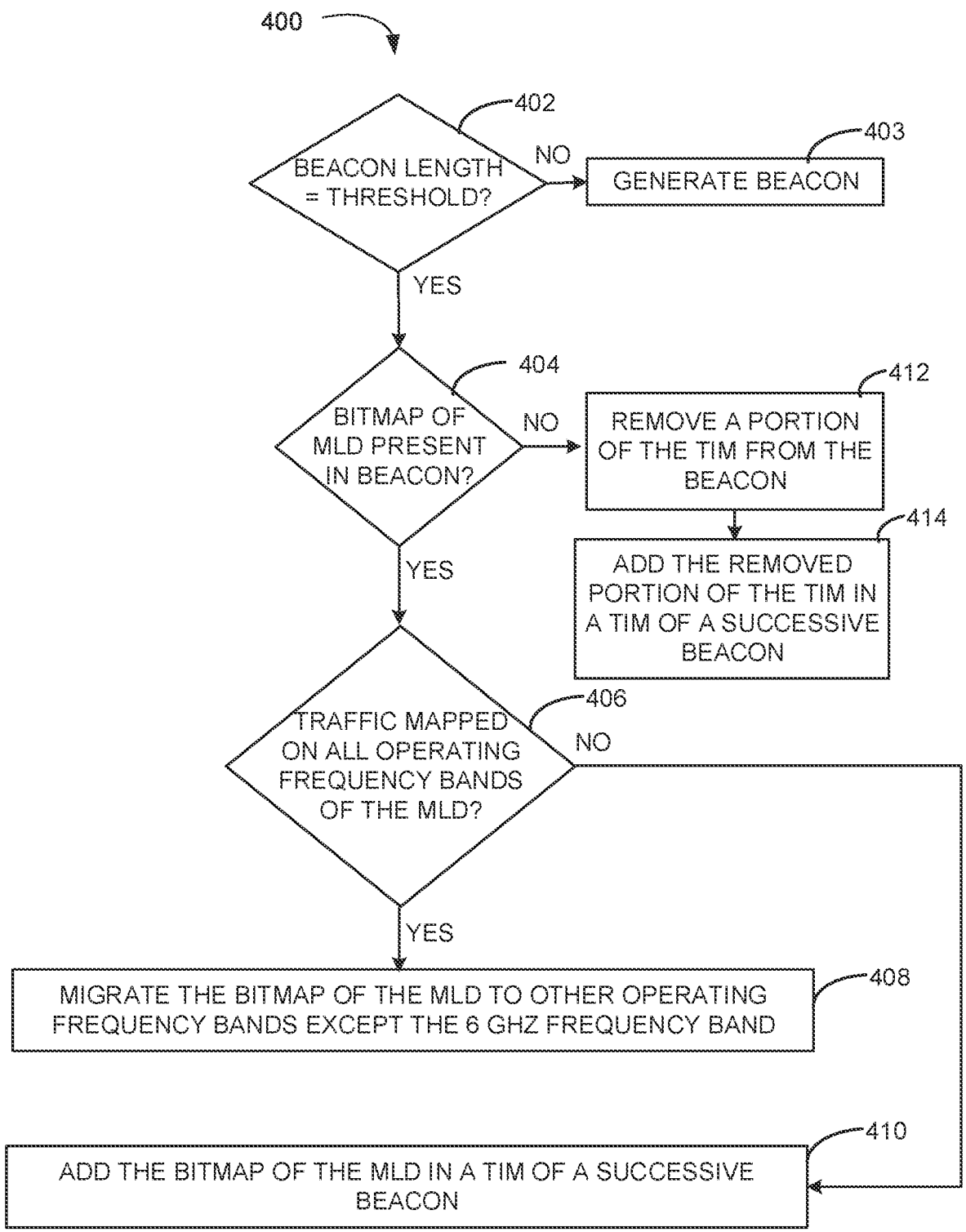
FIG. 4 illustrates an example method for Traffic Indication Map (TIM) generation, in accordance with an embodiment of the present invention.

FIG. 4 illustrates an example method 400 of generating a compact TIM, in accordance with an embodiment of the present invention. The steps of FIG. 4 may be executed by an AP, such as an AP 104A of FIG. 1. At block 402, the AP may check a length of a beacon of a multiple BSSID set configured in the AP. The multiple BSSID set may operate in a 6 GHz band of the AP. In an example, the AP may compare the length of the beacon with a threshold value at a fixed interval, say 90 milliseconds. In an example, the fixed interval is less than a Target Beacon Transmission Time (TBTT) for the multiple BSSID set. In an example, the threshold value may range between 300 bytes and 400 bytes. In response to determining that the length of the beacon of the multiple BSSID set is less that the threshold ("No" branch from block 402), at block 403, the AP may generate the beacon.

At block 404, in response to determining that the length of the beacon of the multiple BSSID set equals the threshold ("Yes" branch from block 402), at block 404, the AP may check whether a bitmap of an MLD is present in a TIM of the beacon. The bitmap may be a PVB in the TIM. In an example, portions of the TIM may be tagged to carry PVBs for different MLDs. PVB of an MLD may be lengthy and if such a PVB of an MLD is carried in the beacon, the beacon may become bulky.

In response to determining that PVB of an MLD is included in the TIM ("YES" branch from block 404), at block 406 the AP may check whether traffic of the MLD is mapped on all operating frequency bands of the MLD. The traffic of the MLD refers to data traffic exchanged between clients associating with VAPs affiliated to the MLD. If data traffic carried between the clients and the VAPs of the MLD is carried on multiple frequency bands on which VAPs of the MLD operate, the AP may determine that the traffic of the MLD is mapped on all operating frequency bands of the MLD.

In response to determining that the traffic is mapped on all operating frequency bands of the MLD ("Yes" branch from block 406), the AP may migrate the bitmap of the MLD to other operating frequency bands except the 6 GHz frequency band, at block 408. In an example, migrating the bitmap of the MLD to other operating frequency bands includes removing the PVB of the MLD from the beacon of the multiple BSSID set and adding the PVB into a beacon of a VAP operating in a 5 GHz or 2.4 GHz band which is affiliated to the MLD. In an example, the AP may generate, as a result of the migrating, a compact TIM in the beacon of the multiple BSSID set. Since, the bitmap of the MLD is migrated to beacons of VAPs in other frequency bands, the beacon of the multiple BSSID set is substantially reduced in length and hence is more compact.

In response to determining that the traffic is not mapped on all operating frequency bands of the MLD ("No" branch from block 406), the AP may remove the bitmap of the MLD from the TIM of the beacon. At block 410, the AP may add the bitmap of the MLD in a TIM of a successive beacon of the multiple BSSID set. In an example, the successive beacon is a beacon consecutive to the present beacon sent by the multiple BSSID set after a beacon interval.

Further, in response to determining that PVB of an MLD is not included in the TIM ("No" branch from block 404), the AP may remove a portion of the TIM from the beacon, at block 412. In an example, the portion of the beacon may include TIMs corresponding to some of VAPs of the multiple BSSID set. In some examples, the AP may fragment the TIM into multiple portions and transmit each portion of the TIM in consecutive beacons of the multiple BSSID set. At block 414, the AP may add the removed portion of the TIM in a TIM of a successive beacon from the multiple BSSID set. Thus, the length of the TIM is shared by two beacons and both the beacons remain compact.

Figure 5:
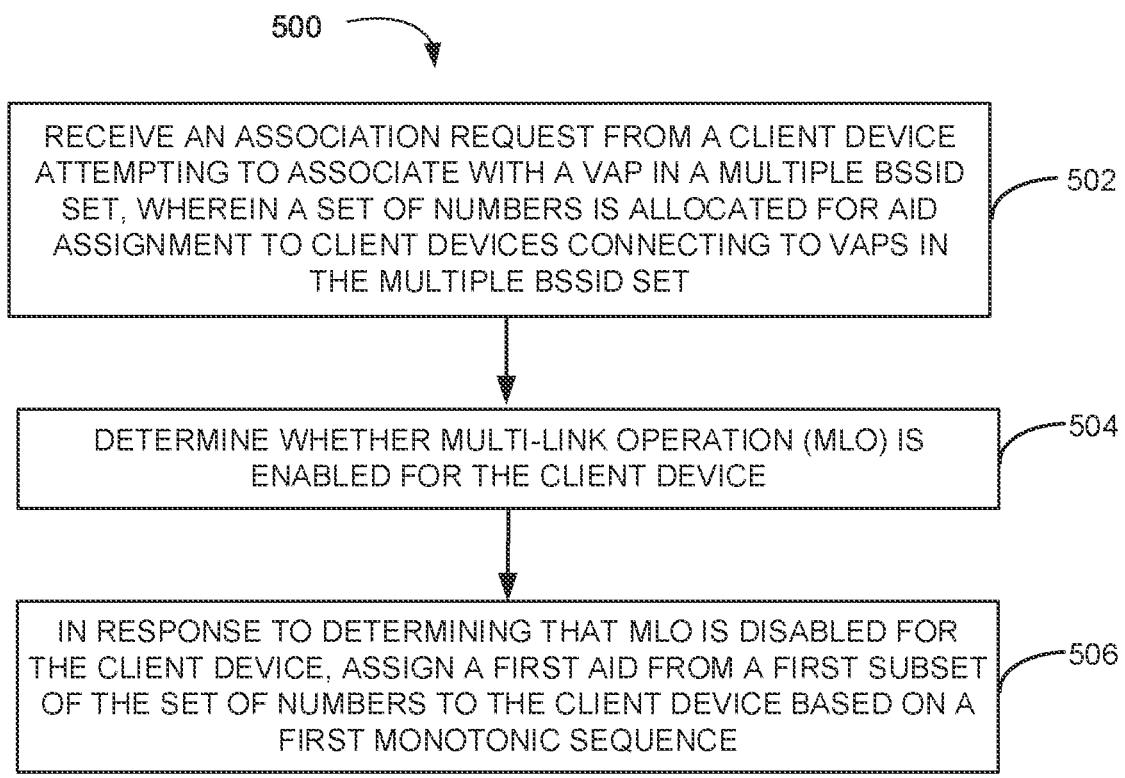
FIG. 5 illustrates an example method for assignment of AIDs, in accordance with an embodiment of the present invention.

FIG. 5 illustrates another example method 500 for AID assignment, in accordance with an embodiment of the present invention. The steps of FIG. 5 may be executed by an AP, such as an AP 104 of FIG. 1.

Consider an AP configured with a multiple BSSID set having multiple VAPs. At block 502, the AP may receive an association request from a client device attempting to associate with one of the multiple VAPs in the multiple BSSID set. In an example, a set of numbers, such as Set 302A of FIG. 3 is allocated for AID assignment to client devices connecting to VAPs in the multiple BSSID set. In an example, the set may include a first subset of numbers for AID assignment to non-Multi-Link (non-ML) client devices based on a first monotonic sequence and a second subset of numbers for AID assignment to ML client devices based on a second monotonic sequence.

At block 504, the AP may determine based on the association request, whether MLO is enabled for the client device. In an example, before determining whether MLO is enabled for the client, the AP may check from the association request whether the client device is a PS client or non-PS client. In response to determining that the client device is a PS client, the AP may assign an AID to the client from a third subset of the set of numbers, such as the third subset 308A of the Set 302A shown in FIG. 3. In response to determining that the client device is a PS client, the AP may execute block 504.

At block 506, in response to determining that MLO is disabled for the client device, assigning, by the AP, a first AID, from the first subset to the client device based on the first monotonic sequence. In another example, in response to determining that MLO is enabled for the client device, the AP may assign a second AID to the client device from the partition of the second subset of the set of numbers based on the second monotonic sequence. Further, one or more steps of the method 400 illustrated in FIGS. 4 and 4 may be executed by the AP in combination with the method 500 of FIG. 5.

Figure 6:
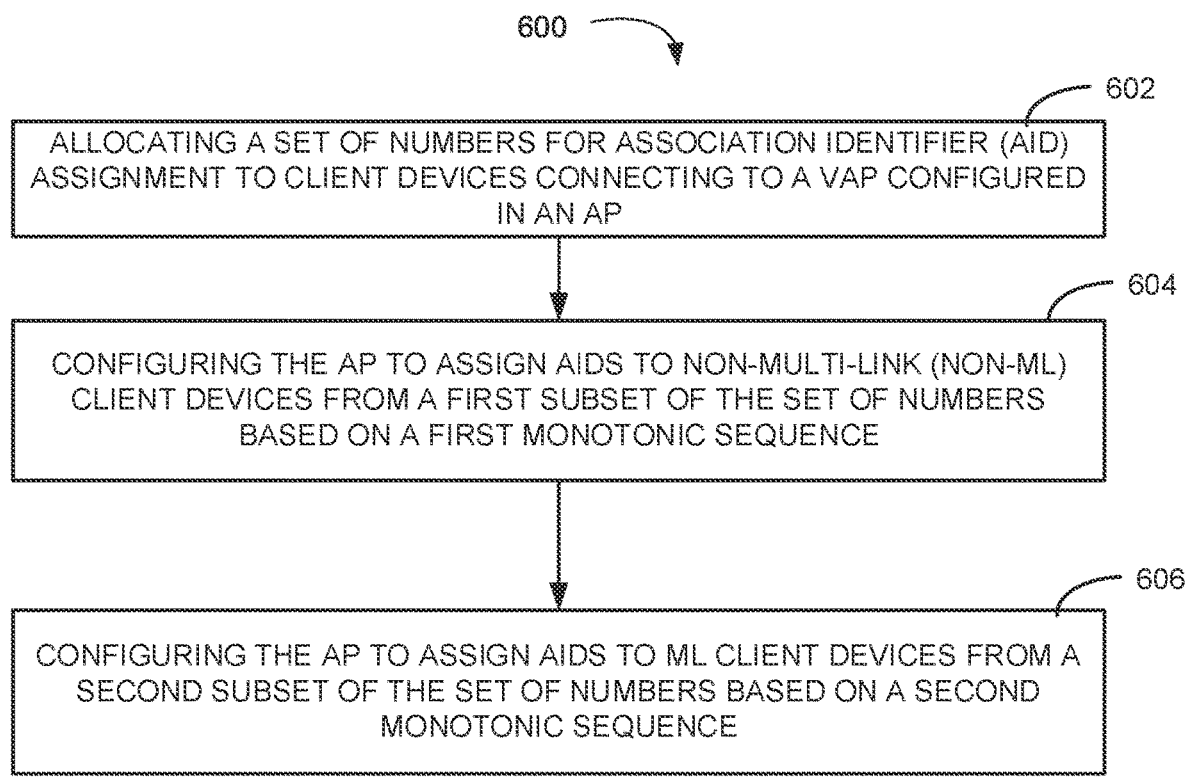
FIG. 6 illustrates an example method for management of AIDS, in accordance with an embodiment of the present invention.

FIG. 6 illustrates an example method 600 for managing AIDs in an AP, in accordance with an embodiment of the present invention. The steps of method 600 may be executed by a controller, such as a controller 102 of FIG. 1.

Referring to FIG. 6, at block 602, the controller may allocate a set of numbers for AID assignment to client devices associating with a VAP configured in an AP. In an example, there may be multiple VAPs in the AP and a separate set of numbers may be allocated for AID assignment to client devices associating with each of the multiple VAPs. Thus, a set of numbers per VAP is maintained for AID assignment.

At block 604, the controller may configure the AP to assign AIDs to non-ML client devices from a first subset of the set of numbers based on a first monotonic sequence. In an example, the controller may configure the AP to assign AIDS to non-ML client devices associating with a VAP from a first subset of the set of numbers allocated to the VAR The first monotonic sequence may be an increasing or decreasing order of numbers in which AIDS are assigned to non-ML clients from the first subset of the set of numbers.

At block 606, the controller may configure the AP to assign AIDS to ML client devices from a second subset of the set of numbers based on a second monotonic sequence. In an example, the controller may configure the AP to assign AIDS to ML client devices associating with a VAP from the second subset of the set of numbers allocated to the VAR The second monotonic sequence may be an increasing or decreasing order of numbers in which AIDS are assigned to ML clients from the second subset of the set of numbers.

Further, in an example, the controller may allocate a partition of the second subset of the set of numbers for AID assignment to client devices associating with VAPs affiliated to a Multi-Link Device (MLD), where the MLD comprises the VAP and another VAP operating in a different frequency band. The controller may configure the AP to share the partition of the second subset of the set of numbers for AID assignment to client devices associating with VAPs affiliated to the MLD. Thus, the partition of the second subset of the set of numbers acts as a common range of numbers from which AIDS may be assigned to ML clients associating to VAPs affiliated to a single MLD.

Figure 7:
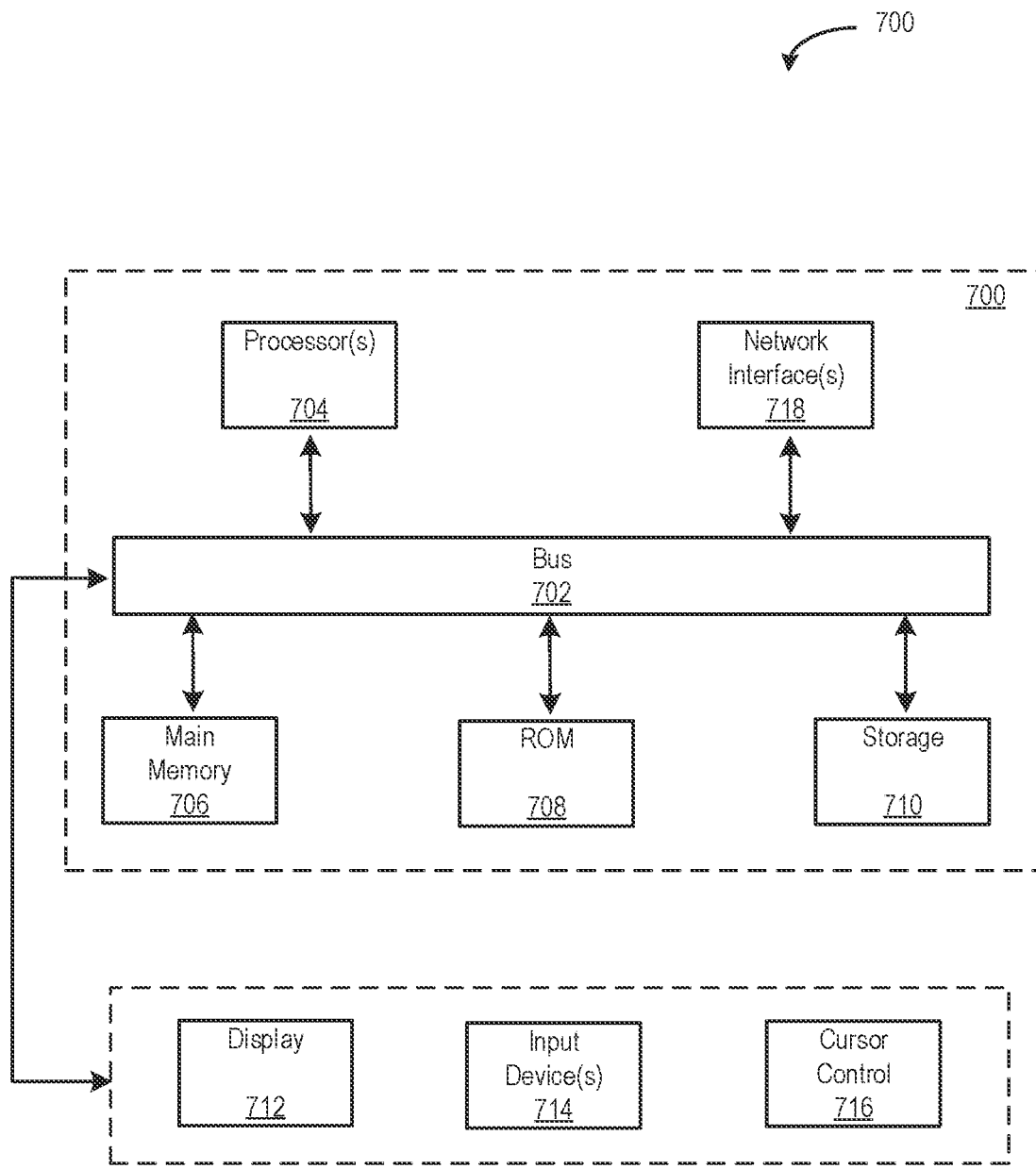
FIG. 7 depicts a block diagram of an example computer system in which the embodiments described herein may be implemented.

FIG. 7 depicts a block diagram of an example computer system 700 in which the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718. The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process steps may be omitted in some implementations. The methods and processes described herein are also not limited to any particular sequence, and the steps or states relating thereto can be performed in other sequences that are appropriate, or may be performed in parallel, or in some other manner. Steps or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although implementations of present invention have been described in language specific to structural features and/or methods, it is to be noted that the present invention is not necessarily limited to the specific features or methods described. Rather, the specific features and methods are disclosed and explained in the context of a few implementations for the present invention.

We claim:

1. A system comprising:
   an Access Point (AP) comprising a plurality of Virtual Access Points (VAPs) in a Multiple Basic Service Set Identifier (BSSID) set; and
   a controller managing the AP, wherein the controller is configured to:
      allocate a set of numbers for Association Identifier (AID) assignment to client devices connecting to VAPs in the multiple BSSID set; and
      configure the AP to:
         assign AIDS to non-Multi-Link (non-ML) client devices from a first subset of the set of numbers based on a first monotonic sequence; and
         assign AIDS to ML client devices from a second subset of the set of numbers based on a second monotonic sequence; and
   wherein the AP is configured to:
      receive an association request from a client device to associate with a VAP of the plurality of VAPs;
      determine, based on the association request, whether Multi-Link operation (MLO) is enabled for the client device; and
      in response to determining that MLO is disabled for the client device, assign a first AID to the client device from the first subset based on the first monotonic sequence.

2. The system of claim 1, wherein the Multiple BSSID set is operating in a 6 GHz frequency band.

3. The system of claim 1, wherein the controller is further configured to allocate another set of numbers for AID assignment to client devices connecting to another VAP co-located in the AP and not included in the multiple BSSID set.

4. The system of claim 3, wherein the controller is further configured to allocate a partition of the second subset of the set of numbers for AID assignment to client devices associating with VAPs affiliated to a Multi-Link Device (MLD), the MLD comprising the VAP of the plurality of VAPs and the other VAP.

5. The system of claim 4, wherein the AP is configured to:
   in response to determining that MLO is enabled for the client device, assign a second AID to the client device from the partition of the second subset of the set of numbers based on the second monotonic sequence.

6. The system of claim 1, wherein the second subset has a boundary value consecutive to a boundary value of the first subset.

7. The system of claim 1, wherein the AP is configured to:
   in response to determining that a length of a beacon of the multiple BSSID set equals a threshold, check whether a bitmap of an MLD is present in a Traffic Indication Map (TIM) of the beacon;
   in response to determining that the bitmap of the MLD is present in the TIM, check whether traffic of the MLD is mapped on all operating frequency bands of the MLD;

in response to determining that the traffic is mapped on all operating frequency bands of the MLD, migrate the bitmap of the MLD to other operating frequency bands except the 6 GHz frequency band; and generate, as a result of the migrating, a compact TIM in the beacon of the multiple BSSID set.

8. The system of claim 7, wherein the AP is configured to:

in response to determining that the traffic is not mapped on all operating frequency bands, remove the bitmap of the MLD from the TIM of the beacon; and add the removed bitmap of the MLD in a TIM of a successive beacon.

9. The system of claim 1, wherein the controller is further configured to allocate a third subset of the set of numbers for AID assignment to non-Power Saver (non-PS) client devices, wherein the third subset includes numbers near a boundary value of the set.

10. The system of claim 9, wherein the compact TIM has a length less than or equal to 64 bits.

11. The system of claim 1, wherein the AP is configured to generate, as a result of the configuration, a compact TIM in a beacon of the multiple BSSID set.

12. The system of claim 1, wherein the set of numbers ranges from 1 to 1024.

13. The system of claim 1, wherein the AP is configured to transmit data traffic at a rate ranging from 10 Gigabits per second (Gbps) to 40 Gbps.

14. A method for Association Identifier (AID) assignment, comprising:

receiving, by an AP comprising a plurality of Virtual Access Points (VAPs) in a Multiple Basic Service Set Identifier (BSSID) set, an association request from a client device attempting to associate with a VAP of the plurality, wherein a set of numbers is allocated for AID assignment to client devices connecting to VAPs in the multiple BSSID set, wherein the set includes a first subset of numbers for AID assignment to non-Multi-Link (non-ML) client devices based on a first monotonic sequence and a second subset of numbers for AID assignment to ML client devices based on a second monotonic sequence; and determining, by the AP based on the association request, whether Multi-Link Operation (MLO) is enabled for the client device; and in response to determining that MLO is disabled for the client device, assigning, by the AP, a first AID, from the first subset to the client device based on the first monotonic sequence.

15. The method of claim 14, further comprising:

in response to determining that MLO is enabled for the client device, assign a second AID to the client device from the partition of the second subset of the set of numbers based on the second monotonic sequence.

16. The method of claim 14, further comprising:

in response to determining that a length of a beacon of the multiple BSSID set equals a threshold, check whether a bitmap of an MLD is present in a Traffic Indication Map (TIM) of the beacon;

in response to determining that the bitmap of the MLD is present in the TIM, check whether traffic of the MLD is mapped on all operating frequency bands of the MLD;

in response to determining that the traffic is mapped on all operating frequency bands of the MLD, migrate the bitmap of the MLD to other operating frequency bands except the 6 GHz frequency band; and generate, as a result of the migrating, a compact TIM in the beacon of the multiple BSSID set.

17. The method of claim 14, further comprising:

in response to determining that the traffic is not mapped on all operating frequency bands, remove the bitmap of the MLD from the TIM of the beacon; and add the removed bitmap of the MLD in a TIM of a successive beacon.

18. A method for managing Association Identifiers (AIDS) in an Access Point AP), comprising:

allocating a set of numbers for Association Identifier (AID) assignment to client devices connecting to a VAP configured in the AP; and configuring the AP to:

assign AIDs to non-Multi-Link (non-ML) client devices from a first subset of the set of numbers based on a first monotonic sequence; and assign AIDS to ML client devices from a second subset of the set of numbers based on a second monotonic sequence.

19. The method of claim 18, further comprising allocating a partition of the second subset of the set of numbers for AID assignment to client devices associating with VAPs affiliated to a Multi-Link Device (MLD), wherein the MLD comprises the VAP and another VAP operating in a different frequency band.

20. The method of claim 19 further comprising configuring the AP to share the partition of the second subset of the set of numbers for AID assignment to client devices associating with the other VAR affiliated to the MLD.

* * * * *